G. R. EDDELBUETTEL-REIMERS.
CABLE CLAMP.
APPLICATION FILED AUG. 30, 1912.
1,069,400.
Patented Aug. 5, 1913.
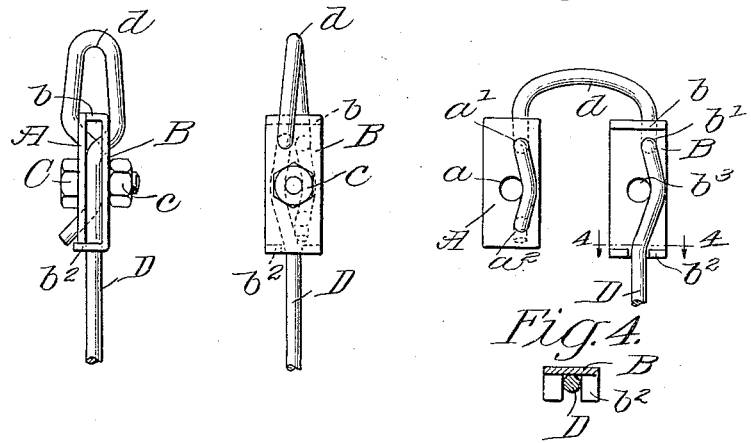
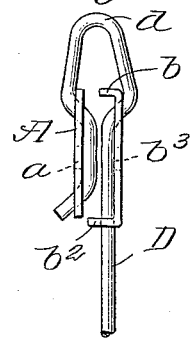
WITNESSES
Samuel E. Wade
Meyer G. Clear
INVENTOR
GUSTAV R. EDDELBUETTEL-REIMERS
BY Munn & Co.
ATTORNEYS
COLUMBIA PLANOGRAPH CO., WASHINGTON, D. C.

UNITED STATES PATENT OFFICE.

GUSTAV R. EDDELBUETTEL-REIMERS, OF BELLINGHAM, WASHINGTON.

CABLE-CLAMP.

1,069,400.

Specification of Letters Patent.  Patented Aug. 5, 1913.

Application filed August 30, 1912. Serial No. 717,888.

*To all whom it may concern:*

Be it known that I, GUSTAV R. EDDELBUETTEL-REIMERS, a citizen of the United States, and a resident of Bellingham, in the county of Whatcom and State of Washington, have invented an Improvement in Cable-Clamps, of which the following is a specification.

My invention relates to cable clamps, the object being to provide a simple and comparatively inexpensive device which possesses strength and durability and which will safely and effectively clamp a cable and prevent the same from slipping in any direction.

In the accompanying drawing, which illustrates the preferred embodiment of my invention and which forms a part of this specification, Figure 1 is a side elevation illustrating my invention in its practical application. Fig. 2 is a front elevation thereof. Fig. 3 is an elevation illustrating the plates in detached relation and in the position they will assume when the cable is threaded therethrough and before their connection. Fig. 4 is a detail cross section taken through one of the plates substantially on the line 4—4 of Fig. 3, and Fig. 5 is a side elevation of the clamping plates in the position they will assume after being pressed together but before their clamping bolt is connected therethrough.

Referring now to these figures, I provide clamping plates A and B which are adapted to oppose each other and which are substantially rectangular and of the specific formation as clearly shown in the figures. The plate A is provided with a central bolt opening $a$ and with cable receiving openings $a'$ and $a^2$, these latter openings being arranged adjacent opposite ends of the plate and upon the same side of its longitudinal center, as clearly shown in Figs. 2 and 3. The plate B is provided at one end with a lateral flange $b$ and with an opening $b'$ adjacent said flange and arranged at one side of its longitudinal center. The plate B is further provided with a lateral flange $b^2$ at its opposite end, this flange being provided with a central recess or cut-out portion which is adapted to form a cable guide, as hereinafter clearly described. In their assembled relation, the plates A and B oppose each other in the manner clearly shown in Fig. 1, the flange $b$ of plate B forming a bearing for the respective ends of the plate A. The clamping bolt C which passes through the central opening $a$ of plate A and also through the central opening $b^3$ of plate B, is threaded to receive a nut $c$, whereby the plates may be clampingly secured in the relation stated.

In the practical application of the clamp, the cable D is placed within the cut-out portion or recess of the flange $b^2$ and its end is passed through the opening $b'$ to the outer side of plate B. The extremity of the cable is then returned, forming a loop $d$ and is then passed through the opening $a'$ to the inner surface of the plate A and then exteriorly of the plate through the opening $a^2$. Usually the parts are more readily assembled if the bolt C is loosely extended through the plates and those portions of the cable D which lie against the inner faces of the clamping plates are bent around opposite sides of the bolt shank, as clearly indicated in Figs. 2 and 3. From this it will be noted that in the assembled relation of the parts, the recessed flange $b^2$ of plate A effectively prevents side slip of the cable and it will be further noted that the opposite flange $b$ of said plate forms a bearing for the adjacent end of the plate A and prevents this end of the clamp from becoming deformed should the looped portion $d$ of the cable be bent.

It should, of course, be understood that, in its passage through the several openings $a'$, $b'$ and $a^2$, and in its several bends between the said openings, the cable D is subjected to considerable friction, through the action of which the said cable may be effectively clamped without tightening the bolt C to the extent it would otherwise have to be.

What I claim is:—

1. A cable clamp comprising a pair of clamping members, one of which has a cable guide and an opening adapted to receive a portion of the cable therethrough, and the other of which members has a pair of openings adapted to receive a return bend of the cable therethrough, and a bolt connecting the plates whereby to securely clamp the cable.

2. A cable clamp comprising a pair of clamping members, one of which has a cable guide and a cable receiving opening, and the other of which members has a pair of cable receiving openings, and a bolt extending centrally through and connecting the members, and around opposite sides of which the cable may be bent between the members.

3. A cable clamp comprising a pair of clamping plates each having one or more cable receiving openings, one of said plates having a lateral flange at one end and a cable guide at its opposite end, against the former of which one end of the other plate is adapted to bear, and a member for clampingly connecting the plates.

4. A cable clamp comprising a pair of clamping plates each having one or more cable receiving openings, one of said plates having a lateral flange at one end against which the adjacent end of the other plate is adapted to bear, and said first-named plate being also provided with a flange having a central cut-out portion forming a cable guide, and a bolt clampingly connecting the said plates.

GUSTAV R. EDDELBUETTEL-REIMERS.

Witnesses:
W. H. HEATON,
R. B. STUART.

Copies of this patent may be obtained for five cents each, by addressing the "Commissioner of Patents, Washington, D. C."